United States Patent
Grochowski et al.

(10) Patent No.: US 7,085,919 B2
(45) Date of Patent: *Aug. 1, 2006

(54) PREDICATE PREDICTION BASED ON A PREDICATED PREDICATE VALUE

(75) Inventors: Edward T. Grochowski, San Jose, CA (US); Hans J. Mulder, San Francisco, CA (US); Vincent E. Hummel, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 09/973,429

(22) Filed: Oct. 9, 2001

(65) Prior Publication Data
US 2002/0016907 A1 Feb. 7, 2002

Related U.S. Application Data

(63) Continuation of application No. 09/224,414, filed on Dec. 31, 1998.

(51) Int. Cl.
G06F 9/44 (2006.01)

(52) U.S. Cl. .................................. 712/226
(58) Field of Classification Search ............... 712/226, 712/234, 235, 236
See application file for complete search history.

(56) References Cited

U.S. PATENT DOCUMENTS

| | | | |
|---|---|---|---|
| 4,578,750 A | 3/1986 | Amdahl et al. ............ 364/200 |
| 4,967,351 A | 10/1990 | Zmyslowski et al. ....... 364/200 |
| 4,999,800 A | 3/1991 | Birger ........................ 364/748 |
| 5,471,593 A | 11/1995 | Branigin .................... 395/375 |
| 5,590,362 A | 12/1996 | Baum et al. |
| 5,627,981 A * | 5/1997 | Adler et al. ................ 712/235 |
| 5,857,104 A | 1/1999 | Natarjan et al. ............ 395/705 |
| 5,903,750 A | 5/1999 | Yeh et al. ................... 395/583 |
| 5,923,863 A * | 7/1999 | Adler et al. ................ 712/216 |
| 6,009,512 A | 12/1999 | Christie ...................... 712/226 |
| 6,021,487 A | 2/2000 | Maliszewski ............... 712/221 |
| 6,115,808 A | 9/2000 | Arora ......................... 712/219 |
| 6,240,510 B1 * | 5/2001 | Yeh et al. ................... 712/236 |
| 6,353,883 B1 * | 3/2002 | Grochowski et al. ....... 712/240 |
| 6,367,004 B1 * | 4/2002 | Grochowski et al. ....... 712/226 |

(Continued)

FOREIGN PATENT DOCUMENTS

EP 0 855 645 A2 7/1998

(Continued)

OTHER PUBLICATIONS

Microsoft. Computer Dictionary: The Comprehensive Standard for Business, School, Library, and Home. Second Edition. Redmond, Washington: Microsoft Press © 1994. Terms: conditional branch and conditional jump.*

(Continued)

Primary Examiner—Eddie Chan
Assistant Examiner—Aimee J. Li
(74) Attorney, Agent, or Firm—Blakely, Sokoloff, Taylor & Zafman LLP

(57) ABSTRACT

In one method, a predicted predicate value may be determined. A predicated instruction is then conditionally executed depending on the predicted predicate value. For example, in accordance with one embodiment of the present invention, a predicate table stores historical information corresponding to a predicate. A pipeline coupled to the table receives a predicted predicate value calculated from the historical information. The pipeline may use this predicted predicate value to conditionally execute a predicated instruction. The actual predicate value is provided back to the predicate table from the pipeline.

20 Claims, 5 Drawing Sheets

U.S. PATENT DOCUMENTS

| | | | |
|---|---|---|---|
| 6,442,679 B1* | 8/2002 | Klauser et al. | 712/218 |
| 6,513,109 B1* | 1/2003 | Gschwind et al. | 712/200 |
| 6,629,238 B1* | 9/2003 | Arora et al. | 712/241 |
| 2001/0032308 A1* | 10/2001 | Grochowski et al. | 712/226 |

FOREIGN PATENT DOCUMENTS

| | | |
|---|---|---|
| WO | WO 97/48042 | 12/1997 |
| WO | WO 98/08160 | 2/1998 |
| WO | WO 99/14667 | 3/1999 |

OTHER PUBLICATIONS

Heuring, Vincent P. and Jordan, Harry F. Computer Systems Design and Architecture. Reading, Mass.: Addison Wesley Longman, Inc. © 1997. pp. 72-73, 174-175, 200, and 228.*

Tyson, Gary Scott. "The Effects of Predicated Execution on Branch Predication". ACM © 1994.*

Mahlke, Scott A.; Hand, Richard E.; Bringmann, Roger A.; Gyllenhaal, John C.; Gallagher, David M; and Hwu, Wen-mei W. "Characterizing the Impact of Predicated Execution on Branch Prediction". CCM © 1994.*

August, David I.; Connors, Daniel A.; Gyllenhaal, John C.; and Hwu, Wen-mei W. "Architectural Support for Compipler-Synthesized Dynamic Branch Prediction Strategies: Rationale and Initial Results". IEEE © 1997.*

Dulong, et al., "An Overview of the Intel® IA-64 Compiler", Intel Technology Journal Q4, 1999, pp. 1-15.

Intel® Itanium® Architecture Software Developer's Manual, Part II: Optimization Guide for the Intel® Itanium® Architecture, Predication, Control Flow, and Instruction Stream, vol. 1: Application Architecture, Revision 2.0, Dec. 2001, pp. 1:129, 1:155-1:163.

Intel® Itanium® Processor, Product Highlights, Copyright ® 2001, Intel Corporation.

Tom R. Halfhill, "Beyond Pentium II", BYTE.com, Dec. 1997, pp. 1-10.

Jim Turley, "64-Bit CPUs: What you Need to Know", Extreme Tech, Feb. 8, 2002, pp. 1-12.

Nicholas P. Carter, ECE 412—Advanced Computer Architecture, Lecture 4: Predication, Sep. 13, 2000, pp. 1-17.

Pnevmatikatos et al., "Guarded Execution and Branch Prediction in Dynamic ILP Processors", Proceedings of the 21st Annual International Symposium on Computer Architecture, IEEE, pp. 120-129.

Mahlke et al., "Characterizing the Impact of Predicated Execution Branch Prediction", Proceedings of the 27th Annual International Symposium Microarchitecture, Micro-27, IEEE, Nov. 30-Dec. 2, 1994, pp. 217-227.

D. Grunwald et al., "Confidence Estimation for Speculation Control", 1998 IEEE, pp. 122-131.

E. Jacobsen et al., "Assigning Confidence Branch Predictions", 1996 IEEE, pp. 142-152.

S.A. Mahlke, "Effective Compiler Support for Predicated Execution Using the Hyperbolic", 1992 IEEE, pp. 45-54.

S. Manne et al., "Pipeline Gating: Speculation Control for Energy Reduction", 1998 IEEE, pp. 132-141.

K.C. Tal et al., "Evaluation of a predicate-based software testing strategy", IBM Systems Journal, vol. 33, No. 3, 1994, pp. 445-457.

IEEE Computer, vol. 31, No. 1, Jan. 1998, Wen-Mai Hwu, "Introduction to predicated execution", pp. 49-50.

* cited by examiner

PREDICATE PREDICTION BASED ON A PREDICATED PREDICATE VALUE

This is a continuation of patent application Ser. No. 09/224,414, filed Dec. 31, 1998 now U.S. Pat. No. 6,367,004.

FIELD OF THE INVENTION

The present invention relates to computer systems and more particularly to computer system processors that support predication and perform predicate prediction.

BACKGROUND OF THE INVENTION

A processor manipulates and controls the flow of data in a computer system. Increasing the speed or throughput of the processor will tend to increase the computational power of the computer. Processor designers employ many different techniques to increase processor speed and throughput to create more powerful computers for consumers. One technique used by designers is called predication.

Predication is the conditional execution of instructions depending on the value of a predicate. For example, consider the following sequence of instructions:

COMPARE $R1=R2 \rightarrow p2$ $(p2)$ ADD $R3+R4 \rightarrow R5$

The first instruction, COMPARE $R1=R2 \rightarrow p2$, determines a value for the predicate p2 based on a comparison of the operands R1 and R2. If the value of register R1 is equal to the value of register R2, then the value of predicate p2 is set to "True", and if the values of R1 and R2 are not equal, then p2 is set to "False." "True" and "False" are typically represented in the processor as single bit values "1" and "0", respectively, (or "0" and "1", respectively, in a negative logic implementation).

The second instruction, (p2) ADD $R3+R4 \rightarrow R5$, includes two parts. The first part, (p2), predicates (or conditions) the second part, ADD $R3+R4 \rightarrow R5$, on the value of predicate p2. If P is true (e.g. a "1"), then the value of R5 is set equal to the value of R3+R4. If p2 is false (e.g. a "0"), then the second part of the instruction is skipped (essentially treating the instruction like a no-op) and the processor executes the next sequential instruction in the program code sequence.

Unfortunately, the COMPARE instruction can take a long time to execute. Because of this, the execution of dependent, subsequent instructions, such as the ADD instruction, may be delayed until the COMPARE instruction completes execution. The present invention address this and other problems.

SUMMARY OF THE INVENTION

A method and apparatus for performing predicate prediction is described. In one method, the least significant bits (LSBs) of a first operand are compared to the LSBs of a second operand. The result of this comparison is used to determine a predicted predicate value for a predicate. A predicated instruction is then conditionally executed depending on the predicted predicate value.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

Figure 1:
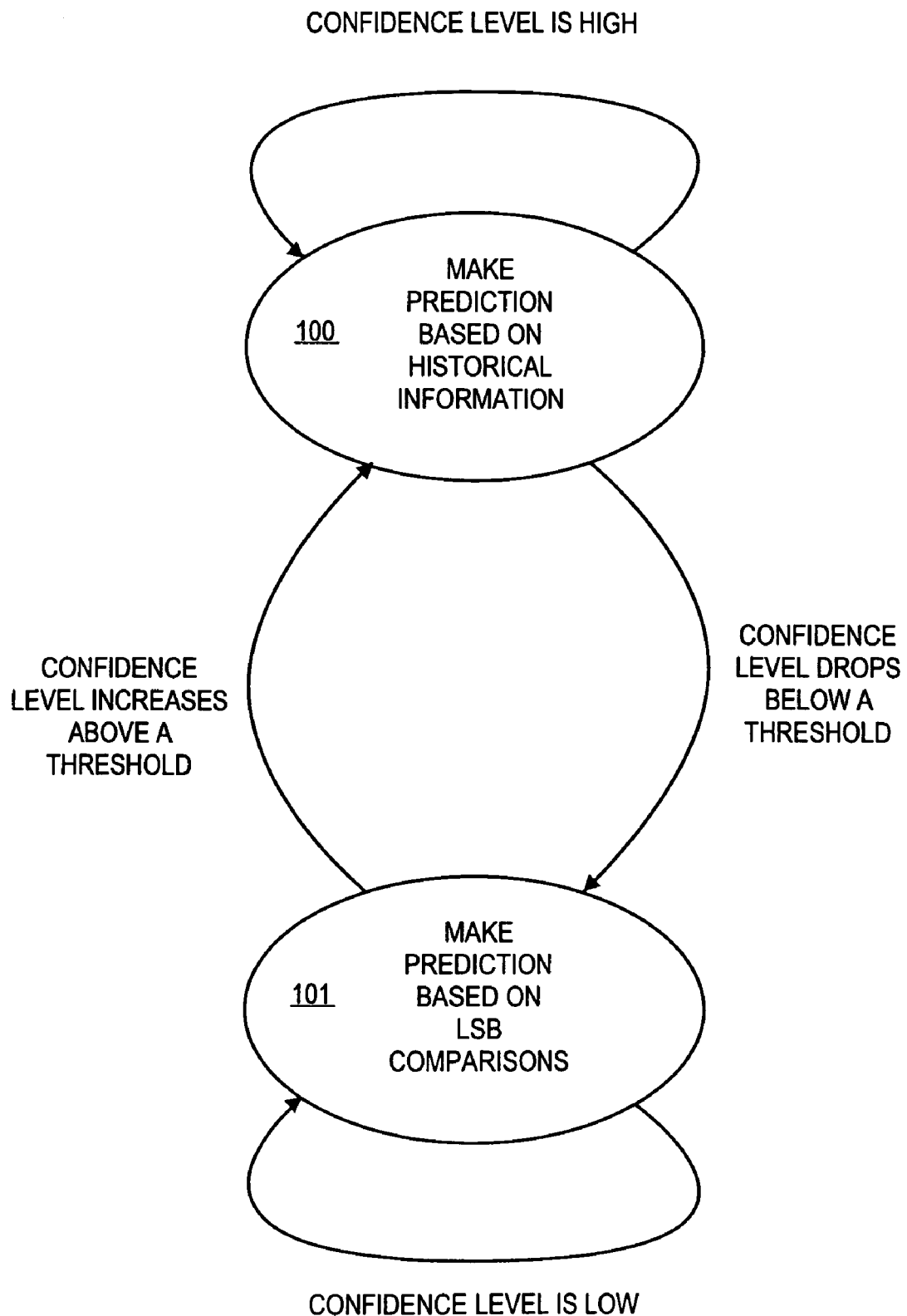
FIG. 1 is a state diagram for a predicate predictor formed in accordance with an embodiment of the present invention.

A method and apparatus for performing predicate prediction is described. In accordance with one embodiment of the present invention, a predicate value is predicted using either historical information or by comparing a selection of least significant bits (LSBs) of the two operands of the COMPARE instruction that determines the predicate value. If the predicate predictor has determined a high confidence in its ability to accurately predict a predicate value based on historical information associated with the predicate, then the historical information is used to determine the predicted predicate value (PPV). If, on the other hand, the predicate predictor has a low confidence in its ability to accurately predict a predicate value based on the historical information, then the PPV is determined by comparing the LSBs of the first operand to the LSBs of the second operand. Once the PPV is determined for a predicate, an instruction that is predicated on the predicate is conditionally executed, depending on the PPV, by either executing the instruction normally or treating the instruction like a no-op.

After the COMPARE instruction completes execution, the resulting actual predicate value (APV) is compared to the PPV to determine the accuracy of the prediction. If the prediction was correct, execution of subsequent instructions continues normally. If the prediction was incorrect, the backend portion of the processor pipeline is flushed, and the instructions are re-executed beginning with the predicated instruction, using the APV for the predicate value. The APV is also used to update the historical information associated with the predicate stored in a predicate history table.

A more detailed description of embodiments of the present invention, including various configurations and implementations, is provided below. For simplicity, the terms "predicate register", "predicate", "predicate ID", and "predicate value" may be used interchangeably, and the terms "register", "register ID", "register value", and "operand" may also be used interchangeably. For example, "predicate prediction" is understood to mean, more precisely, "predicate value prediction." As another example, "comparing a first register to a second register" is understood to mean, more precisely, "comparing a value stored in the first register to a value stored in the second register."

Consider, again, the following sequence of instructions:

COMPARE $R1=R2 \rightarrow p2$ $(p2)$ ADD $R3+R4 \rightarrow R5$

As described above, the first instruction determines a value for the predicate p2. The second instruction is a predicated instruction, the execution of which is predicated (or conditioned) on the value of predicate p2. In a highly pipelined processor, the COMPARE instruction may take several clocks to complete execution. To prevent the ADD instruction from being delayed by these clocks, the value of predicate p2 is predicted, and the ADD instruction is then conditionally executed depending on the PPV of p2.

FIG. 1 is a state diagram for a predicate predictor formed in accordance with an embodiment of the present invention in which two states are defined. For simplicity, this state diagram is described with reference to the sequence of instructions discussed above.

In state 100, the PPV for predicate p2 is calculated by the predicate predictor using the historical information associated with predicate p2. If the APV for p2 is determined to be equal to the PPV after executing the COMPARE instruction, then the prediction was correct. Correct predictions may establish a high confidence level in the ability of the predicate predictor to accurately calculate a PPV for p2 based on the historical information. Because the confidence level is high, a subsequent prediction for p2 is also made based on this historical information the next time the instruction sequence is encountered in the program code.

If, however, the APV is not equal to the PPV, then the prediction is incorrect. The confidence level may drop due to the misprediction for p2. If the confidence level drops below a threshold, the state machine transitions to state 101 of FIG. 1. This state represents the operation of the predicate predictor when there is a low confidence in the ability of the predictor to accurately calculate a PPV for p2 based on the historical information associated with p2. After transitioning to state 101, a subsequent prediction for p2 is made based on a comparison of the LSBs of the operands of the COMPARE instruction, R1 and R2, rather than using historical information for p2.

For one embodiment of the present invention, the predicate predictor calculates a first confidence level in its ability to accurately calculate a PPV for p2 based on historical information. The predictor also calculates a second confidence level in its ability to accurately calculate a PPV for p2 based on LSB comparisons. High and low confidence levels are then determined by comparing the two calculated confidence levels to each other, thereby establishing a variable confidence level threshold. For an alternate embodiment, only a single confidence level is calculated by the predictor, and this confidence level is compared to a predetermined threshold to delineate high and low confidences. For purposes of this discussion, stating that the predicate predictor has a high or low confidence in its ability to accurately calculate a PPV for a predicate based on historical information is equivalent to stating that the predicate predictor has a low or high confidence, respectively, in its ability to accurately calculate a PPV for the predicate based on operand LSB comparisons.

If the confidence level rises above the threshold, then the predicate predictor transitions back to state 100 of FIG. 1. As a result of this transition, a subsequent PPV for p2 is calculated by the predicate predictor using the historical information associated with p2 rather than using a comparison of the LSBs of the operands. For an alternate embodiment of the present invention, the state diagram may include additional states such as a state in which the processor is stalled until the APV for the predicate is determined.

Figure 2:
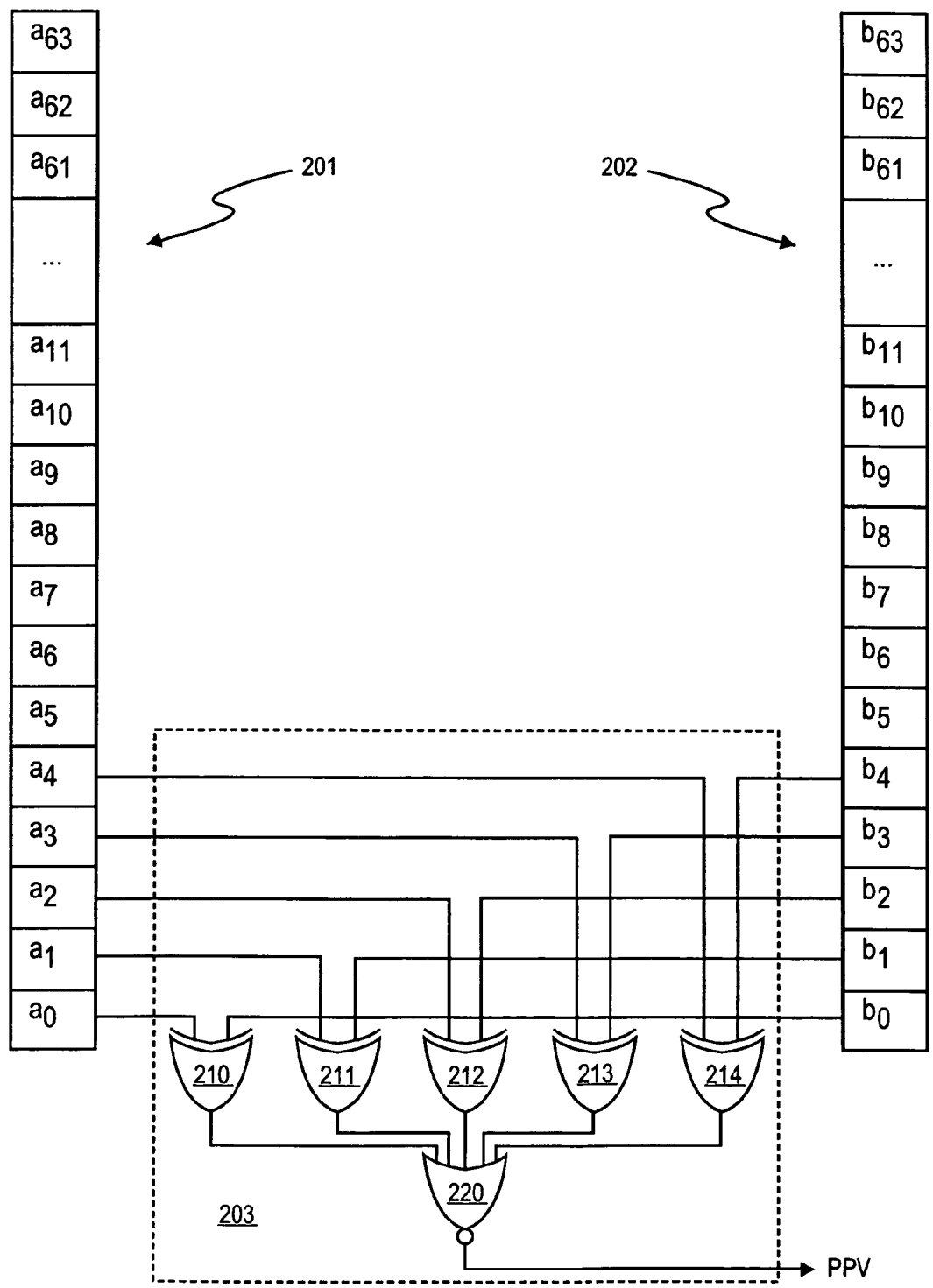
FIG. 2 is a comparator formed in accordance with an embodiment of the present invention.

FIG. 2 is a comparator formed in accordance with an embodiment of the present invention in which the LSBs of the operand stored in register R1, 201, are compared to the LSBs of the operand stored in register R2, 202 to determine a PPV. In accordance with the embodiment of FIG. 2, only the least significant five bits of the 64-bit operands are compared within comparator 203 to determine a PPC. Bits a(0) and b(0), a(1) and b(1), a(2) and b(2), a(3) and b(3), and a(4) and b(4) are compared for equality using XOR gates 210, 211, 212, 213, and 214, respectively. The output of each of XOR gates 210–214 is provided to the input of NOR gate 220, the output of which is PPV. For this embodiment, a PPV of 1 indicates that the least significant five bits from the operand of register 201, a(0–a(4), are equal to the least significant five bits from the operand of register 202, b(0)–b(4). A PPV of 0 indicates that the bits are note equal to each other.

In accordance with one embodiment of the present invention, comparing the LSBs of two operands may generate a result faster than comparing all the bits of the operands. This may be due to, for example, fan-in limitations of the logic gates of a comparator. The fan-in limitation may necessitate a time consuming, extended cascade of logic gates to compare all the bits of the operands. By comparing only the LSBs of the two operands, rather than all the bits, a fast, two level cascade, such as the one shown in FIG. 2, may be used.

In general, if the two operands are close in value, then a comparison of a sufficient number of LSBs of the operands can predict the result of comparing all the bits of the operands. The number of LSBs to be compared to generate a PPV for the predicate may be determined by appropriately balancing PPV accuracy, comparator size, and comparator speed. For example, as the number of LSBs that are compared increases, PPV accuracy also increases, but comparator size may also increase and comparator speed may decrease. Conversely, as the number of LSBs that are compared decreases, comparator size also decreases and comparator speed increases, but PPV accuracy may decrease.

For one embodiment of the present invention, the least significant quarter or less of the operand bits are compared to determine the PPV. For 64-bit operands, this amounts to the least significant 16 bits of each operand. For another embodiment, the least significant eighth or less of the operand bits are compared to determine the PPV. For 64-bit operands, this amounts to the least significant byte of each operand. Note, however, that the present invention is not limited to 64-bit operand sizes. Any number of operand sizes may be used in conjunction with alternate embodiments of the present invention. In addition, any number of LSBs less than the total number of bits in the operand may be compared to a corresponding number of LSBs of another operand to determine the PPV.

Although the comparator in FIG. 2 determines if the LSBs are equal, comparators formed in accordance with alternate embodiments of the present invention may compare for any mathematical relationship between the LSBs or any other portion of bits of the operands. For example, for an embodiment in which a predicate is determined by a COMPARE instruction that determines if a first operand is greater than or equal to a second operand, the comparator calculates the PPV by determining if the LSBs or most significant bits (MSBs) of the first operand are greater than or equal to the LSBs or MSBs of the second operand, respectively. For an embodiment in which a predicate is determined by a COMPARE instruction that determines if a first operand is less than a second operand, the comparator calculates the PPV by determining if the LSBs or MSBs of the first operand are less than the LSBs or MSBs of the second operand, respectively.

Figure 3:
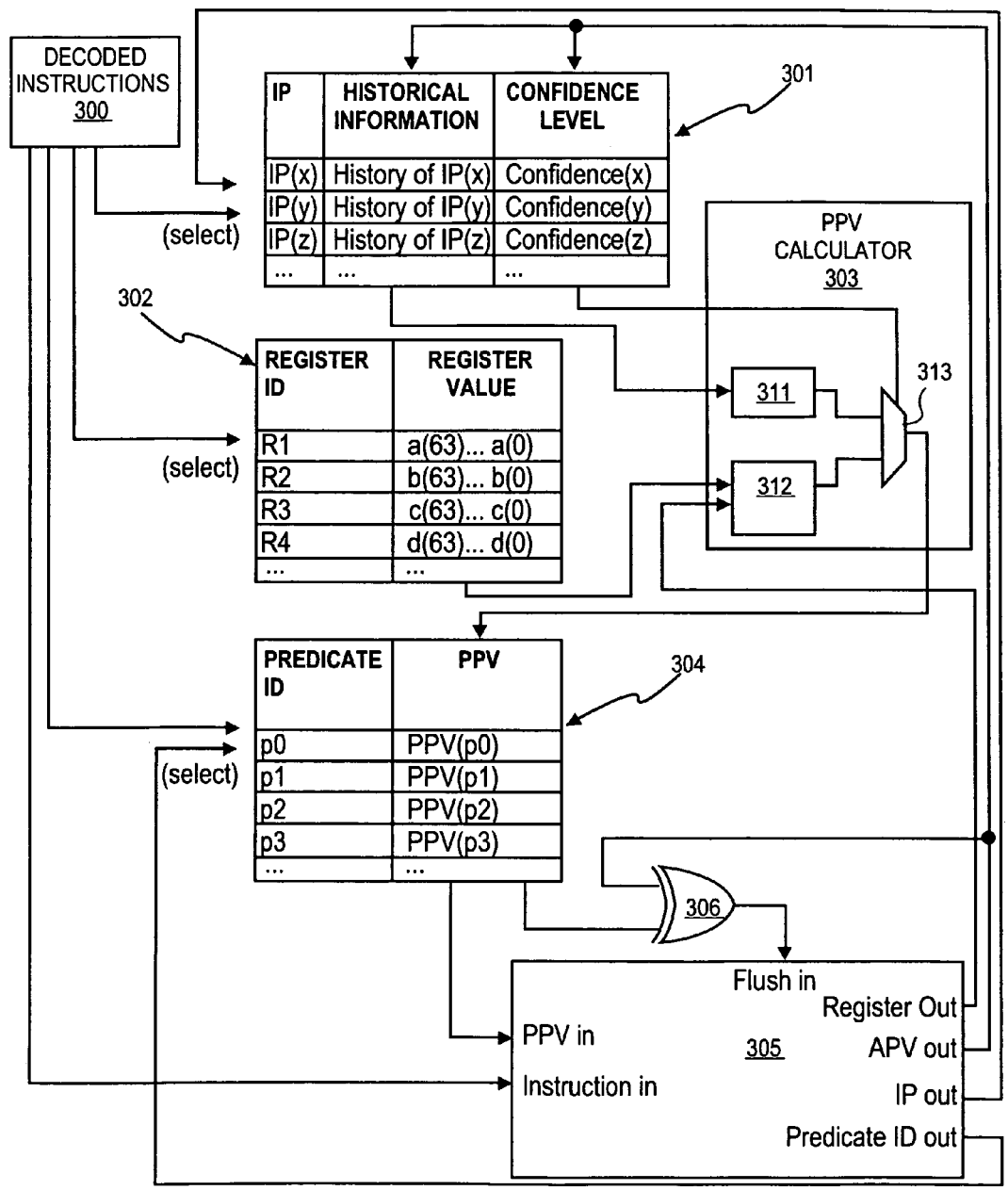
FIG. 3 is a predicate predictor formed in accordance with an embodiment of the present invention.

FIG. 3 is a predicate predictor formed in accordance with an embodiment of the present invention. Predicate history table 301 stores historical information associated with each of any number of instructions, and is indexed by instruction pointers (IPs). In addition, table 301 stores the confidence level associated with the IP. Register file 302 stores the register values associated with any number of registers. The outputs of table 301 and register file 302 are coupled to the inputs of PPV calculator 303, the output of which is coupled to an input of speculative predicate register file (SPRF) 304. One output of SPRF 304 is coupled to the PPV input of processor pipeline 305, and another output of SPRF 304 is coupled to an input of XOR gate 306. Instructions 300, after having been decoded by a decoder (not shown), are provided to the input of pipeline 305 as well as to IP, register, and predicate select circuitry coupled to predicate history table 301, register file 302, and SPRF 304, respectively. For one embodiment, this select circuitry comprises a multiplexer. The APV output of pipeline 305 is coupled to an input of XOR gate 306 and to an input of predicate history table 301. The output of XOR gate 306 is coupled to the flush signal input of pipeline 305. The IP output of pipeline 305 is coupled to the IP select circuitry of table 301, and the predicate ID output of pipeline 305 is coupled to the predicate select circuitry of SPRF 304. The register value output of pipeline 305 is coupled to an input of PPV calculator 303.

To demonstrate the operation of the predicate predictor of FIG. 3, consider the execution of the sequence of instructions described above. After the processor fetches and decodes the first instruction, COMPARE R1=R2→p2, the IP of the instruction is provided to the predicate predictor of FIG. 3 from block 300. The IP of the COMPARE instruction is used to select the appropriate location from predicate history table 301. The historical information and confidence level associated with this instruction (and, hence, the historical information associated with p2) is read from table 301 and provided to PPV calculator 303. Simultaneously, the register IDs of R1 and R2 are used to select the appropriate operands from register file 302. A selection of the LSBs of the operands R1 and R2 are read from table 301 and provided to comparator 312 within PPV calculator 303. Comparator 312 includes circuitry that is constructed and operates in a manner similar to comparator 203 of FIG. 2.

For one embodiment of the present invention, the historical information stored in table 301 of FIG. 3 may include any number of bits, and history-based prediction circuit 311 of PPV calculator 303 may use these bits in conjunction with conventional branch prediction techniques to calculate a PPV for p2. For example, a two bit up-down counter or bimodal prediction technique may be used to tolerate a single, inaccurate PPV within a series of accurate PPVs for p2. Local or global prediction techniques may also be used, or, alternatively, a combination of techniques may be used in, for example, a chooser predictor.

The historical information stored in predicate history table 301 of FIG. 3 may include information related to program history, context correlation, or PPV accuracy rates. For an alternate embodiment of the present invention, some or all of history-based prediction circuit 311 within calculator 303 may be merged into predicate history table 301. In this manner, the PPV based on historical information may be calculated and stored in the table rather than calculated "on the fly" by calculator 303. For an alternate embodiment of the present invention, predicate history table 301 is indexed by the predicate ID of the associated predicate (e.g., p2 in this example) or by the IP of the predicated instruction that uses the PPV calculated by calculator 303.

Confidence levels are also stored in table 301 of FIG. 3. For one embodiment of the present invention, these levels reflect the relative confidence in the accuracy of a predicate prediction based on the historical information. If the confidence level in the accuracy of predictions based on historical information associated with p2 is high (i.e. above a threshold), then the PPV for p2 is determined using the historical information. If, however, the confidence level is low (i.e. below a threshold), then the PPV for p2 is determined by comparing the LSBs of the operands of R1 and R2. A selector, including multiplexer 313, within PPV calculator 303 of FIG. 3 selects the PPV to be based on either the historical information from history-based prediction circuit 311 or the comparison of LSBs from comparator 312. Multiplexer 313 has a first input coupled to the output of history-based prediction circuit 311 and a second input coupled to the output of LSB comparator 312. The control input of multiplexer 313 is controlled by the confidence level from table 301, and the output of the multiplexer is the PPV output of PPV calculator 303.

Note that the LSBs of the operands R1 and R2 from register file 302 may take some time to arrive at comparator 312 within PPV calculator 303 of FIG. 3. This delay may be due to, for example, a long distance between register file 302 and calculator 303. For example, register file 302 and calculator 303 may reside in separate units of the processor. Alternatively, the delay may be due to a read-after-write hazard on R1 or R2. For one embodiment of the present invention, the delay is reduced by coupling calculator 303 to the register bypass bus from pipeline 305. This bus is represented as the coupling between the register value output from pipeline 305 to the input of LSB comparator 312 in PPV calculator 303. Note that this bus may also be coupled to register file 302 as well (not shown) to update the register values in file 302.

Despite the use of the bypass bus, the historical information and confidence level from table 301 may arrive at PPV calculator 303 of FIG. 3 before the operands R1 and R2 arrive at the calculator. As a result, a PPV for p2 based on historical information may be calculated before the PPV based on LSB comparisons is calculated. Therefore, in accordance with one embodiment of the present invention, PPV calculator 303 provides an early prediction, based on historical information, to SPRF 304 when the confidence level is determined to be high. Calculator 303 provides a late prediction, based on LSB comparisons, to SPRF 304 when the confidence level is determined to be low.

The PPV for p2, after being calculated by calculator 303 of FIG. 3, is then entered into SPRF 304 where the PPV awaits access by a subsequent instruction that is predicated on p2. In accordance with one embodiment of the present invention, SPRF 304 is a register file that includes PPV storage locations for all predicates. Speculative predicates (i.e. PPVs) that have not yet been committed to an architectural state are stored in SPRF 304 at the proper location. For an embodiment of the invention in which the processor architecture provides for 64 predicates, SPRF 304 includes 64 locations, p0–p63, in which PPVs may be stored.

In parallel with the activities of the predicate predictor described above, the COMPARE instruction is provided to the input of pipeline 305 of FIG. 3. Within pipeline 305, the APV for p2 is determined by performing a full bit comparison of the operands R1 and R2. While the COMPARE instruction is being executed in the pipeline, but before the APV is determined, the decoded ADD instruction is next provided to the predicate predictor from block 300. The predicate ID of p2 is used to select the appropriate PPV in SPRF 304. The PPV for p2 is read from SPRF 304 and is provided to the PPV input of pipeline 305 while the predicated ADD instruction is provided to the instruction input of pipeline 305. If the PPV for p2 is "True", the ADD instruction is executed normally. If the PPV for a predicate is "False", the instruction is treated as a no-op. Treating an instruction like a no-op means that the instruction is either not executed, or, if executed, the resultant data is not used to update the architectural state of the register file.

While the predicated ADD instruction is executing within pipeline 305 of FIG. 3, the previous COMPARE instruction completes execution and an APV for p2 is determined. The APV for p2 is provided from pipeline 305 at the APV output, and the IP for the COMPARE instruction is provided at the IP output. The IP is transferred to the IP select circuit of predicate history table 301 and is used to select the appropriate location in the table into which the APV for p2 is written. This APV is used to update the historical information and confidence level associated with p2. In addition, the predicate ID of p2 is transferred from the output of pipeline 373 to the predicate select circuit of SPRF 304 to select the appropriate location in the file from which the PPV for p2 is read. This PPV is compared to the APV for p2 via XOR gate 306 to determine if predicate p2 was accurately predicted (i.e. the APV matches the PPV) or was mispredicted (i.e. the APV does not match the PPV). If the PPV for p2 was accurate, instruction execution continues normally. If, however, the PPV was mispredicted, a flush signal is sent from XOR gate 306 to pipeline 305, causing pipeline 305 to flush the instructions being executed therein.

In addition to providing the APV for p2 to predicate history table 301 and to an input of XOR gate 306 of FIG. 3, the APV for p2, along with its predicate ID, is provided to the architectural predicate register file (APRF) (not shown) to update the value of predicate p2. The APRF stores non-speculative, architecturally committed predicate values, and is accessed by subsequent instructions predicated on p2 to determine if the instruction is to be executed or treated like a no-op. Upon providing the PPV for p2 to XOR gate 306, SPRF 304 invalidates the entry associated with p2. In this manner, future access of SPRF 304 by subsequent instructions predicated on p2 will result in a miss, forcing the instructions to use the APV for p2 stored in the APRF.

Note that pipeline 305 of FIG. 3 represents only a portion of the full pipeline of the processor. More specifically, pipeline 305 includes the backend portion of the pipeline, including the execution stage. Because predicate prediction is performed near the backend of the pipeline, fewer instructions must be flushed in comparison to a conventional mispredicted branch recovery process. If the PPV for p2 is mispredicted, the ADD instruction and any subsequent instructions that rely directly or indirectly on the incorrect PPV are flushed and re-executed through pipeline 305.

Figure 4:
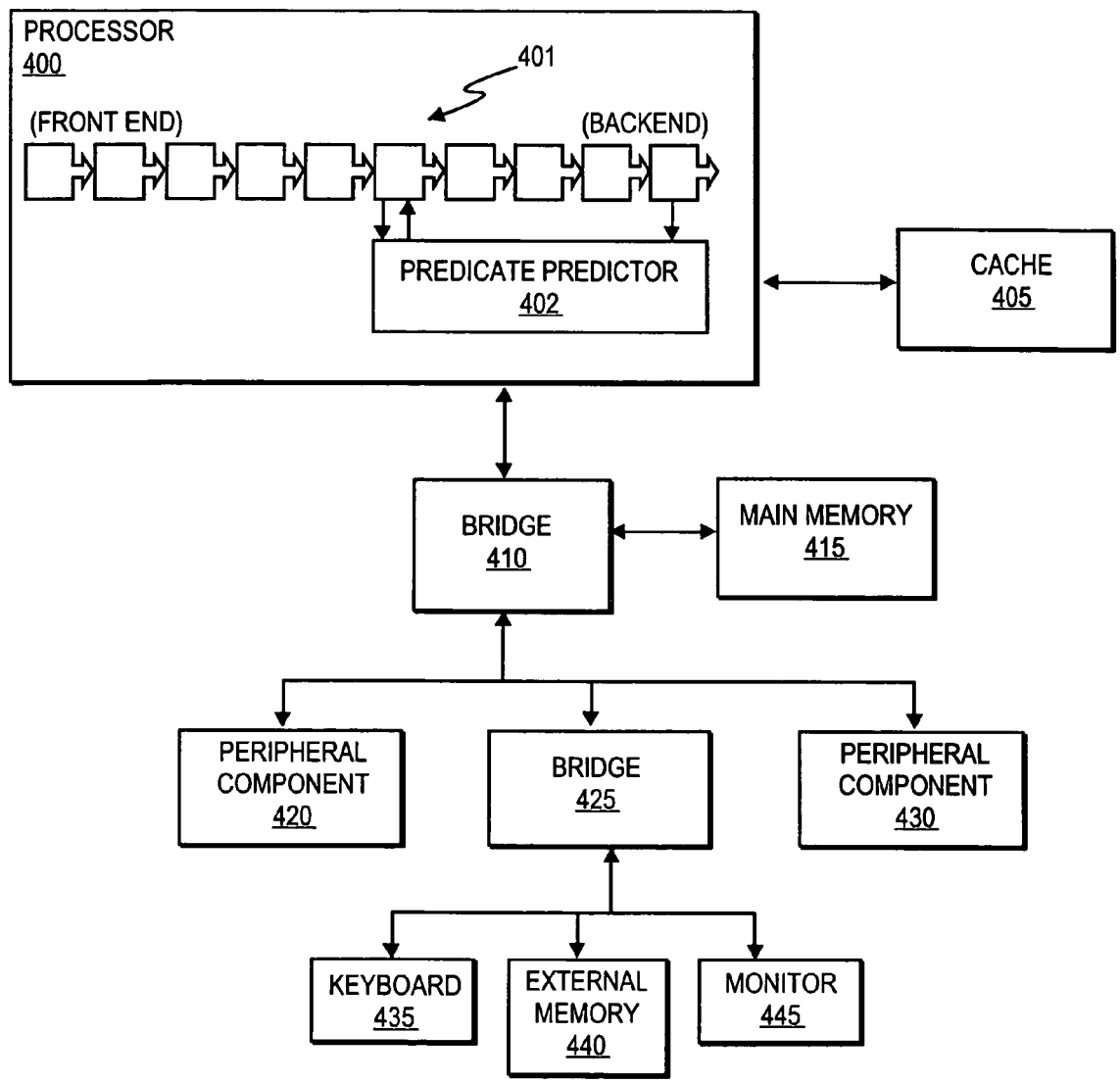
FIG. 4 is computer system formed in accordance with an embodiment of the present invention.

FIG. 4 is computer system formed in accordance with an embodiment of the present invention. Processor 400 is coupled to cache 405 and includes pipeline 401, a backend portion of which is coupled to predicate predictor 402. Bridge 410 is coupled to processor 400 via a system bus. Bridge 410 is used to couple processor 400 to main memory 415 and to peripheral components 420 and 430. Bridge 425 couples keyboard 435, external memory 440, and monitor 445 to bridge 410.

Peripheral components 420 and 430 of FIG. 4 may include audio and video input/output devices such as audio/video generators, accelerators, or analyzers.

External memory 440 may include a hard drive, floppy disk, tape drive, other magnetic storage media, a battery powered random access memory (RAM) device, an electrically programmable read only memory (EPROM) storage device, other solid-state storage device, a CD-ROM, or other non-volatile, machine-readable, storage medium.

In accordance with one embodiment of the present invention, an operand value of a COMPARE instruction, along with the COMPARE instruction itself, is initially stored in external memory 440 of FIG. 4. During operation of the computer system, processor 400 initiates a transfer of the COMPARE instruction and the operand from external memory 440 into main memory 415 via bridges 425 and 410. The COMPARE instruction and the operand may then be transferred to cache 405 before being received and used by processor 400, or the COMPARE instruction and the operand may be transferred directly from main memory 415 to processor 400 via bridge 410.

Once in pipeline 401 of FIG. 4, the COMPARE instruction is decoded. The decoded instruction is provided to predicate predictor 402, which is designed to operate in cooperation with pipeline 401 in a manner similar to the predicate predictor and pipeline described above in conjunction with FIG. 3. During predicate prediction, the LSBs of the operand are compared to the LSBs of a second operand of the COMPARE instruction to calculate a PPV for a predicate. For an alternate embodiment of the present invention, the operand is generated as the result of a calculation by processor 400, and is subsequently stored in external cache 405 or main memory 415. This operand is then recalled by processor 400 for use in executing the COMPARE instruction. Alternatively, the operand may originate within a memory location of either peripheral component 420 or 430.

Figure 5:
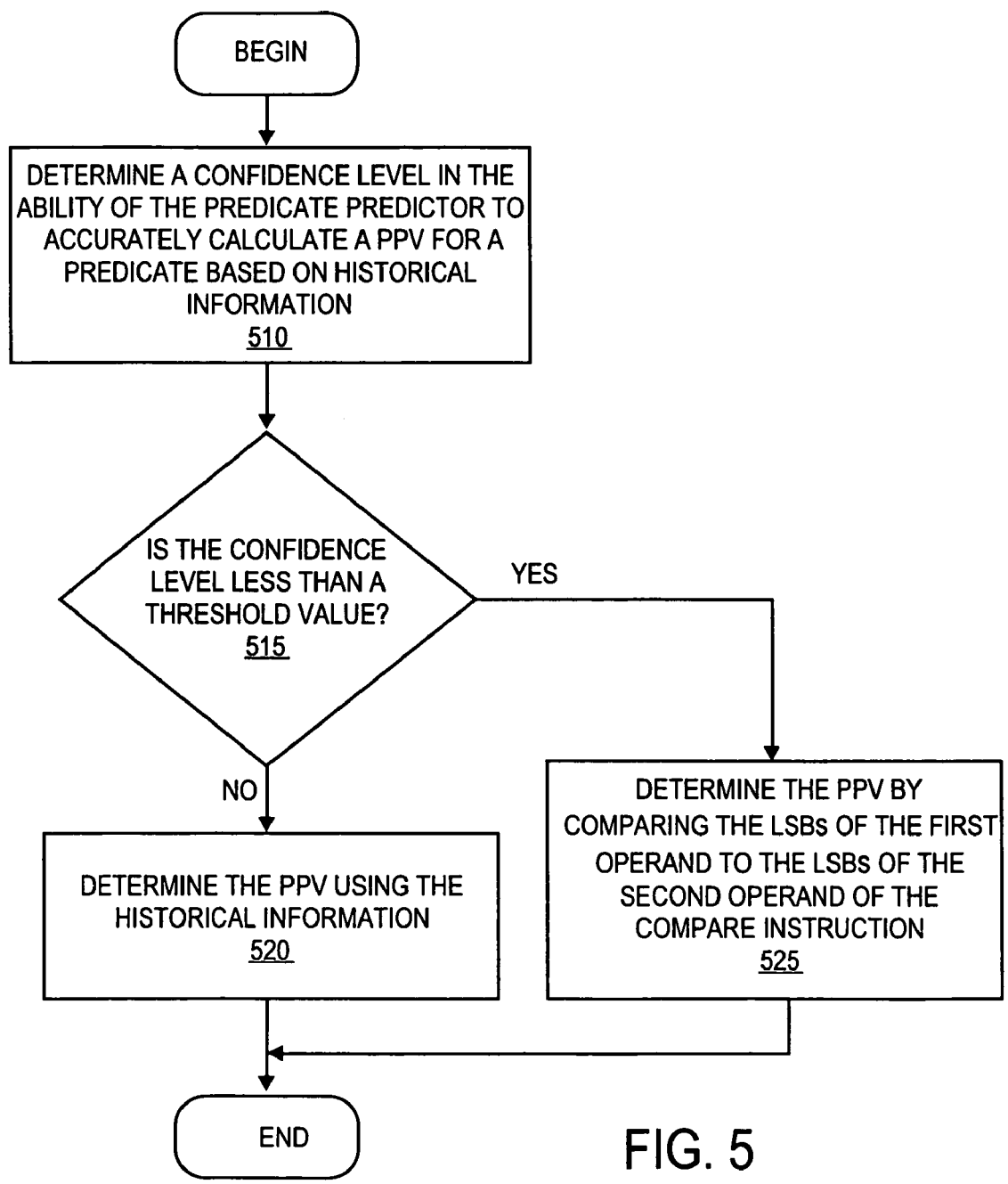
FIG. 5 is a flow chart showing a method of the present invention.

FIG. 5 is a flow chart showing a method of the present invention. At step 510, a confidence level is determined. This confidence level indicates the confidence, as determined by the predicate predictor, in the ability of the predicate predictor to accurately predict a predicate based on historical information associated with the predicate. At step 515 the predictor determines whether or not the calculated confidence level is less than a threshold value.

If the calculated confidence level is less than a threshold value, then the PPV is determined by comparing the LSBs of a first operand to the LSBs of a second operand of a COMPARE instruction at step 525. If, however, the calculated confidence level is not less than a threshold value, then the PPV is determined using historical information commensurate with branch prediction techniques at step 520.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of executing a sequence of instructions comprising:

comparing a subset of bits from a first operand to a subset of bits from a second operand to determine a predicted predicate value (PPV) for a predicate of a predicated instruction, the PPV having a value of TRUE or FALSE;

conditionally executing the predicated instruction, if the PPV has a value of TRUE;

executing a COMPARE instruction to determine an actual predicate value (APV) for the predicate of the predicated instruction;

comparing the APV to the PPV; and flushing a pipeline if the APV and the PPV are unequal.

2. The method of claim 1, further comprising executing the predicated instruction after flushing the pipeline.

3. The method of claim 1, wherein flushing the pipeline comprises flushing only a backend portion of the pipeline.

4. The method of claim 1, further comprising updating historical information corresponding to the predicate of the predicated instruction in a predicate history table after comparing the APV to the PPV.

5. The method of claim 1, wherein conditionally executing the predicated instruction includes treating the predicated instruction like a no-op if the value of the PPV is FALSE.

6. A processor comprising:
a predicate history table;
a register file; and
a predicted predicate value (PPV) calculator having a first input coupled to an output of the predicate history table and a second input coupled to an output of the register file, the PPV calculator to calculate a PPV by comparing a subset of bits from a first operand to a subset of bits from a second operand, having a value of TRUE or FALSE, for a predicated instruction.

7. The processor of claim 6, further comprising:
a IP select circuit having an output coupled to the predicate history table;
a register select circuit having an output coupled to the register file; and
an instruction decoder having an output coupled to input of the IP select circuit and the register select circuit.

8. The processor of claim 6, further comprising a pipeline having a PPV input coupled to an output of the register file and an actual predicate value (APV) output coupled to an input of the predicate history table.

9. The processor of claim 8, further comprising an XOR gate having a first input coupled to the APV output of the pipeline, a second input coupled to an output of the register file, and an output coupled to a flush input of the pipeline.

10. A processor comprising:
a predicate history table to store historical information associated with a predicate of a predicated instruction; and
a predicted predicate value (PPV) calculator to calculate a PPV for the predicated instruction by comparing a subset of bits from a first operand to a subset of bits from a second operand, the PPV having a value of TRUE or FALSE.

11. The processor of claim 10, further comprising a speculative predicate register file to store the PPV.

12. The processor of claim 11, further comprising a pipeline to receive the PPV, and to conditionally execute the predicated instruction if the PPV has a value of TRUE.

13. The processor of claim 10, further comprising a pipeline to receive the PPV, and to conditionally execute the predicated instruction if the PPV has a value of TRUE.

14. The processor of claim 10, wherein the calculator includes a selector to, based on a confidence level, select the PPV to be based on historical information.

15. A system comprising:
memory to store a predicated instruction;
a bus to transfer the predicated instruction from the memory; and
a processor to receive the predicated instruction and to calculate a predicted predicate value (PPV) for the predicate of the predicated instruction by comparing a subset of bits from a first operand to a subset of bits from a second operand, the PPV having a value of TRUE or FALSE.

16. The system of claim 15, wherein the processor comprises a predicate history table to store historical information associated with the predicate of the predicated instruction.

17. The system of claim 16, wherein the processor further comprises a pipeline to receive the PPV, and to conditionally execute the predicated instruction if the PPV has a value of TRUE.

18. The system of claim 15, wherein the processor further comprises a pipeline to receive the PPV, and to conditionally execute the predicated instruction if the PPV has a value of TRUE.

19. The system of claim 15, wherein the memory is main memory and the bus is a system bus.

20. The system of claim 15, wherein the memory is external memory.

* * * * *